United States Patent [19]

Srogi

[11] 4,242,918
[45] Jan. 6, 1981

[54] MECHANICAL PROPULSION SYSTEM

[76] Inventor: Ladislaw G. Srogi, 338 Apple St., Syracuse, N.Y. 13204

[21] Appl. No.: 973,247

[22] Filed: Dec. 26, 1978

[51] Int. Cl.³ .............................................. F16H 27/04
[52] U.S. Cl. ......................................... 74/84 S; 74/61;
105/29 R; 180/7 R; 254/108
[58] Field of Search ............... 74/61, 84 R, 84 S, 111,
74/112, 113, 125.5; 105/29 R, 31, 32; 180/7 R;
254/105, 108

[56] References Cited

U.S. PATENT DOCUMENTS

| 2,088,115 | 7/1937 | Neff | 180/7 R X |
|---|---|---|---|
| 2,886,976 | 5/1959 | Dean | 74/64 X |
| 3,266,233 | 8/1966 | Farrall | 180/7 R X |
| 3,365,012 | 1/1968 | Grossfield | 180/7 R X |
| 3,404,854 | 10/1968 | Di Bella | 74/84 S X |
| 3,530,617 | 9/1970 | Halvorson et al. | 74/84 S X |
| 3,916,704 | 11/1975 | Gaberson | 74/84 R |
| 4,050,527 | 9/1977 | Lebelle | 74/61 X |

FOREIGN PATENT DOCUMENTS 225649  5/1969  U.S.S.R. ............................. 74/84 R

Primary Examiner—Lawrence J. Staab
Attorney, Agent, or Firm—Bruns & Jenney

[57] ABSTRACT

A system for propelling a vehicle which includes a frame within which at least one shuttle is mounted for reciprocal movement along a linear path of travel. An oscillating body is attached to the shuttle that is capable of delivering a series of alternating opposed force pulses to the shuttle with the pulses acting in a direction generally along the shuttle's path of travel. A rectifying means periodically locks the shuttle to the frame when the force pulses act in a first direction whereupon the forces are transmitted to the frame and unlock the shuttle when the forces act in the opposite direction, whereupon the shuttle is caused to move in the opposite direction. A return mechanism is operatively connected to the shuttle for restoring the shuttle to its original starting position after it has been driven a predetermined distance over the path of travel.

17 Claims, 9 Drawing Figures

MECHANICAL PROPULSION SYSTEM

BACKGROUND OF THE INVENTION

This invention relates to a system for propelling a vehicle and, in particular, to a system for efficiently rectifying the bi-directional alternating forces produced by a mechanical oscillator into a uni-directional force system that is capable of driving a vehicle.

The most pertinent prior art known to the Applicant at the time of filing this application is embodied in the following U.S. Pat. Nos.: 1,386,329, 2,886,976, 3,054,463, 3,280,924, 3,433,311, 3,530,617, 4,050,527.

A propulsion system for driving a carriage along a steel tape is described by Dean in the above noted U.S. Pat. No. 2,886,976. The carriage is driven by an oscillator that is adapted to transmit opposed force pulses to the carriage frame. The bi-directional forces are vectorally directed along the path described by the tape to provide a rectilinear thrust acting in both directions. A clutching mechanism acts between the tape and the carriage to lock the carriage to the tape when the pulses act in the first direction and to unlock the carriage when the forces act in a second or opposite direction. The carriage thus pulls itself along the tape in a series of interrupted incremental steps. The freedom of travel afforded the carriage is limited in both direction and distance by the tape.

In theory, the idea of a mechanical thrust producing engine is attractive because of its relatively high efficiency when compared to more conventional internal combustion engines. As will become apparent from the disclosure below, the engine of the present invention is a self-contained device capable of rectifying the output of an oscillator internally to provide an uni-directional thrust suitable for driving an uninhibited or unrestrained vehicle over any desired field of travel or through any suitable media such as air or water.

SUMMARY OF THE INVENTION

It is therefore an object of the present invention to improve mechanical engines for developing a propulsive thrust.

Another object of the present invention is to provide a self-contained engine for developing a uni-directional thrust from the output of a mechanical oscillator.

Yet another object of the present invention is to provide an engine capable of rectifying the forces generated by a plurality of oscillators to produce an uninterrupted thrust capable of driving an unrestricted vehicle in any desired direction.

A further object of this invention is to improve the efficiency of thrust developing engines.

These and other objects of the present invention are attained by means of an engine having a frame in which a shuttle is arranged to move back and forth over a linear path of travel. An oscillator drive is operatively secured to the shuttle so that alternating opposed forces generated by the drive are vectorally pointed in both directions along the shuttle's intended path of travel. A rectifying means locks the shuttle to the frame when the forces act in a first direction whereby the forces are transmitted to the frame and to unlock the shuttle when the forces act in the opposite direction whereby the shuttle is driven within the frame along the path of travel in said opposite direction. A return mechanism is operatively connected to the shuttle for restoring the shuttle to its initial starting position after it has travelled a predetermined distance in the opposite direction.

BRIEF DESCRIPTION OF THE DRAWINGS

For a better understanding of these and other objects of the present invention reference is had to the following detailed description of the invention which is to be read in conjunction with the accompanying drawings, wherein:

FIG. 8 is a graphic representation of the output of the engine shown in FIG. 7; and FIG. 9 is a second side elevation of a propulsion unit embodying the teachings of the present invention showing a dual force rectifying mechanism for allowing the unit to deliver thrust in either direction.

DESCRIPTION OF THE INVENTION

The present invention involves a self-contained engine that is capable of internally converting the rotational forces developed by an oscillator into a uni-directional thrust. Although the engine of the present invention is ideally suited for propelling a vehicle over an unrestricted path of travel, it can be used to drive any other type of suitable apparatus and the invention is not restricted to this single application. Preferably, the oscillator will employ two or more rotating eccentric masses travelling within confined orbits at controlled speeds to generate a sinusoidal output formed by alternating opposed force pulses.

Figure 1:
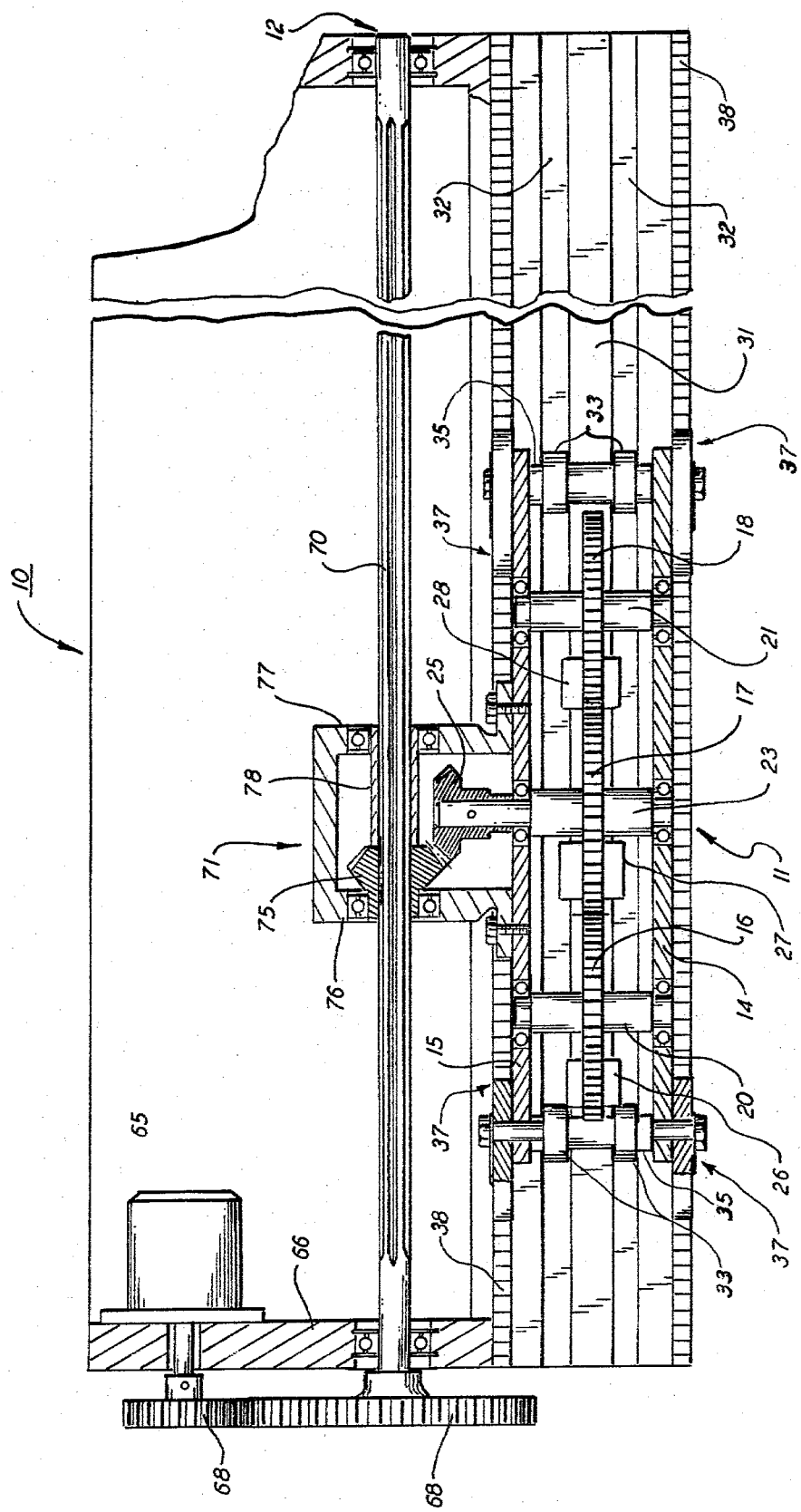
FIG. 1 is a top plan view in section of a propulsion unit embodying the teachings of the present invention wherein a single shuttle is movably mounted within a frame.
Figure 2:
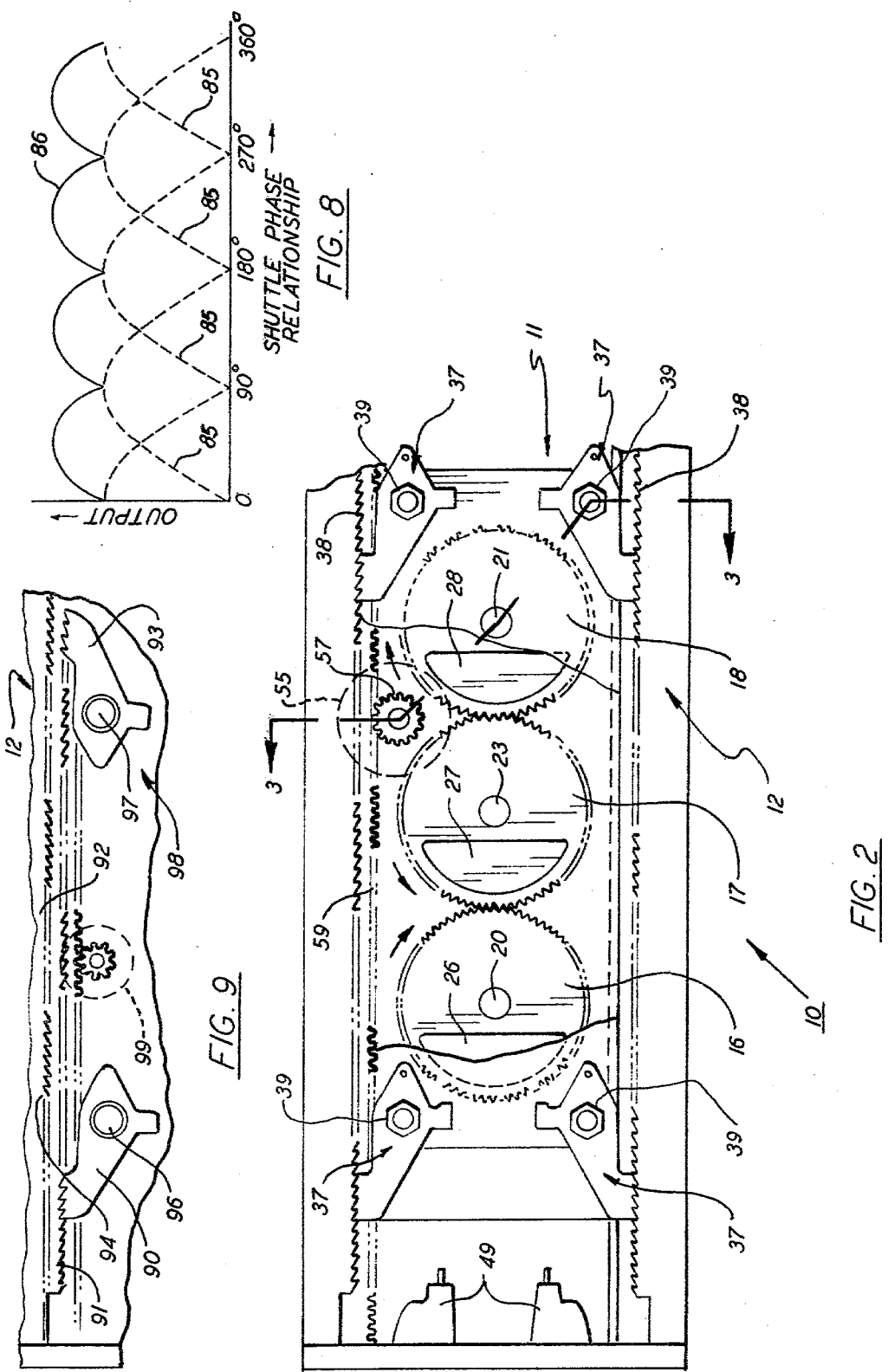
FIG. 2 is a partial front elevation of the propulsion unit shown in FIG. 1 with portions broken away to show an eccentric shuttle drive system for producing an oscillating force acting upon the shuttle.
Figure 3:
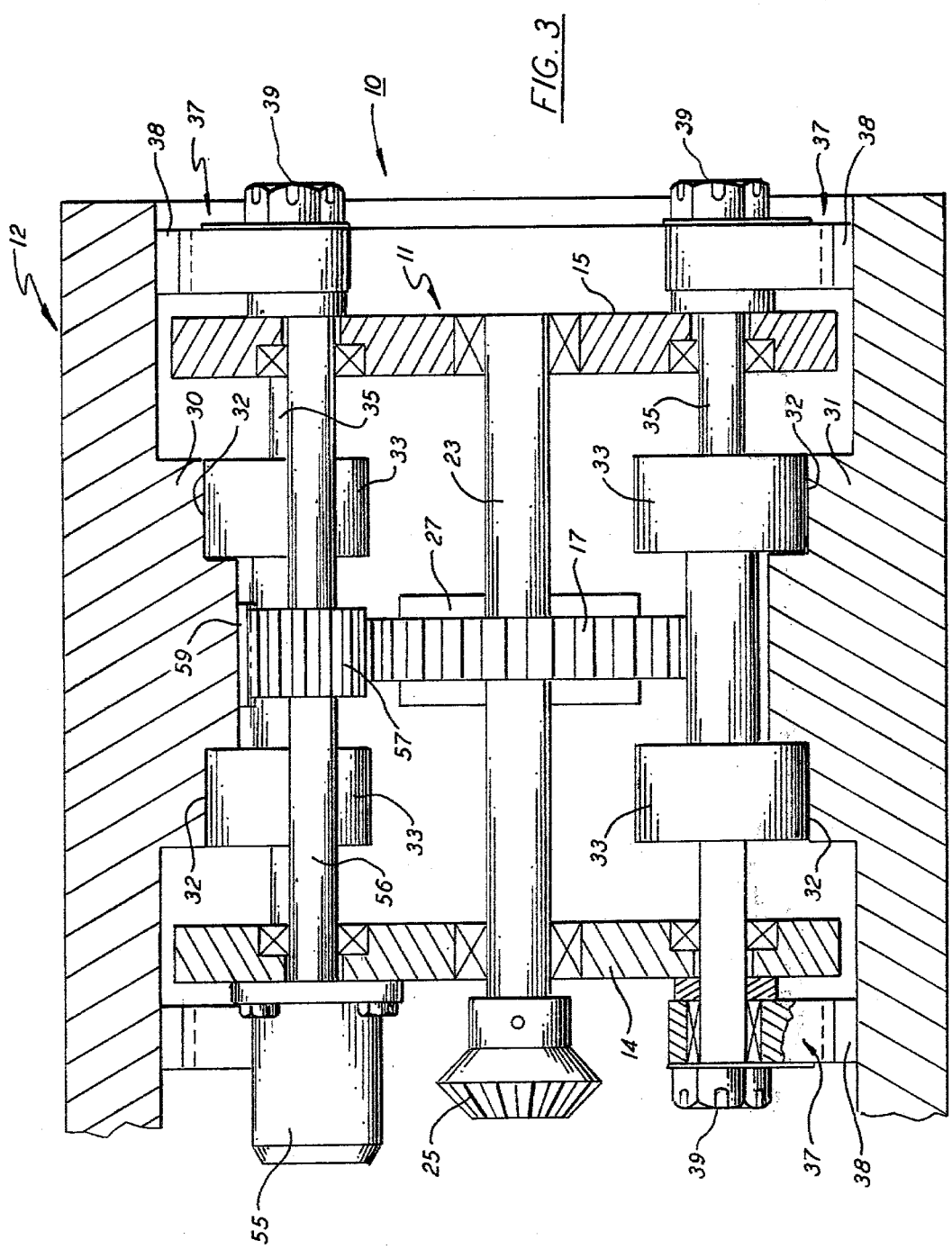
FIG. 3 is a section taken along lines 3—3 in FIG. 2 showing the shuttle return mechanism and force rectifying means in greater detail.

The apparatus of the present invention as depicted in FIGS. 1–3 is shown in its simplest form wherein a single shuttle assembly 11 is movably mounted within a frame 12 to form an engine that is generally referenced 10. Although not shown, the frame of the engine is secured to a vehicle or carriage of any suitable design so that the frame is able to deliver a driving force to the vehicle for propelling it forwardly in a desired direction.

The shuttle assembly 11 includes two vertically aligned side plates 14 and 15 which are supported in spaced parallel relationship to provide a semi-enclosed structure for housing the various components of the assembly. An oscillator drive is located between the plates which includes three meshing spur gears 16, 17 and 18. The gears are all of equal diameters to insure that they will turn at the same speed when the system is put into motion. The two outboard gears 16 and 18 are each mounted upon idler shafts 20 and 21, respectively. The idler shafts are journalled for rotation in the side plates by suitable bearing means as shown and are arranged to support the gears midway between the plates. The central gear 17 is mounted upon a drive shaft 23 which is similarly journalled for rotation in the side plates. The drive shaft passes through side plate 15 and the extended portion of the shaft supports a bevel gear 25 pinned or otherwise affixed thereto.

As best illustrated in FIG. 2, eccentrically positioned weights are secured to each of the spur gears and are indicated as elements 26, 27 and 28. The mass of the center weight 27 is twice that of the two outer weights. The weights are strategically positioned upon the gears so that the three weights are uniformly positioned on the same side of the gear when brought to the 90° and 270° positions as shown in FIG. 2. Accordingly, the rotating masses generate alternating force pulses acting horizontally to the right and left sides of the shuttle. Similarly, as the weights are brought to the 0° and 180° positions, the two outer weights will be positioned directly opposite the larger center weight 27. As a result, the vertical forces generated by the system are negated.

In assembly, the shuttle is movably supported within the frame to enable it to move horizontally over a linear path of travel. The shuttle is directed back and forth over the path of travel by means of an upper guide rail 30 and a lower guide rail 31. The rails span the length of the frame and are each provided with a pair of parallel recessed shoulders 32—32 for receiving shuttle mounted rollers 33—33 therein.

The shuttle rollers are mounted in pairs upon horizontal end shafts 35—35 situated at the corners of the shuttle housing. The end shafts are journalled within the side plates and are provided with centrally located spacers for maintaining the lateral distance between rollers such that they will move freely over the rails without binding. The vertical spacing between the shafts is also accurately maintained so that both the upper situated rollers and the lower situated roller remain in contact with the rails as the shuttle moves over its linear path of travel.

The alternating opposed force pulses generated by the oscillator are herein rectified by means of a pawl and ratchet mechanism whereby a uni-directional force is transmitted to the engine frame. Other devices such as a Scotch yoke or the like capable of rectifying a bi-directional output may be similarly employed without departing from the teachings of the present invention. In assembly eight pawl assemblies 37—37 are mounted in pairs upon the ends of the end shafts 35—35. The pawl assemblies are secured to the shafts by means of lock nuts 39—39 threaded onto the shaft. The pawls are adapted to coact with two upper and two lower ratchet bars 38—38 formed in, or otherwise secured to, the upper and lower walls of the frame. The bars are placed in parallel alignment with the guide rails and extend substantially across the housing.

As viewed in FIG. 2, each pawl and ratchet mechanism is arranged to lock the shuttle to the frame when the force pulses act to the left of the shuttle as seen in FIG. 2. As a result, a propulsive thrust is translated to the frame driving the frame in that direction. On the alternating stroke, when the forces act in the opposite direction, the pawl assemblies are allowed to slip over the ratchet bars whereby the shuttle is driven incrementally along its path of travel in the second or opposite direction. Accordingly, the bi-directional forces generated by the oscillator are converted within the engine into a uni-directional output which can be used to propel a freewheeling vehicle or the like.

Figure 4:
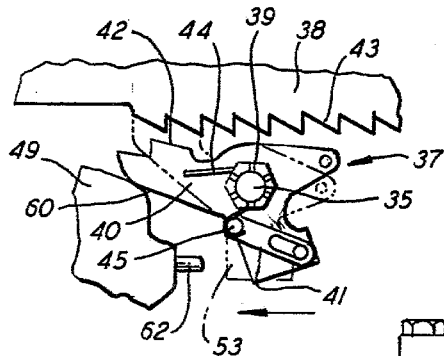
FIGS. 4 and 5 each represent a side view of a pawl and ratchet mechanism utilized in the force rectifying means showing the pawls being cammed into and out of engagement with a ratchet bar.
Figure 5:
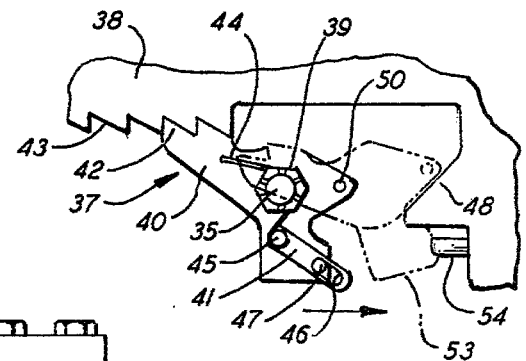

With further reference to FIGS. 2-6, each pawl assembly includes an arm 40 pivotably mounted upon the extended portion of each end shaft and a control link 41 which serves as an overcentering device in the system for both guiding and holding the pawl arm in two independent operative positions. As illustrated in FIG. 5, when in the first operative position, the teeth 42 of the pawl are held in engagement with the teeth 43 of the companion ratchet bar. When positioned in the second operative position as seen in FIG. 4, the teeth of the pawl and ratchet are moved back to a release position out of engagement with the companion ratchet bar.

In assembly, a torsion spring 44 is wound about the end shaft and secured at one end to the link via post 45. The opposite end of the spring is seated within a hole provided in the body of the pawl arm whereby the wound spring exerts a biasing pressure between the arm and the link. A slotted hole 46 is formed in the link through which passes a pin 47 anchored in the arm. The slotted hole is strategically positioned so that the spring will act to bias the pawl arm into either of the two noted operative positions when the arm is rotated upon the shaft.

Rotation of each pawl arm is brought about by means of a pair of camming elements 48 and 49 located at the two extreme ends of each ratchet bar. As the shuttle is being driven incrementally in the second direction, as indicated by the arrow in FIG. 5, a cam follower 50, secured to the pawl arm is driven up the cam surface 51 of element 48 thereby forcing the arm to be rotated in a counterclockwise direction. As depicted by the invisible outline in FIG. 4, the arm is driven to a point where the spring is able to pull the arm into a bar release position.

As the pawl arms swing into the release position, a lug 53 on one of the arms depresses actuator pin 54 on a contact switch (not shown) which, in turn, turns on a return motor 55. The motor is mounted upon the side plate 14 of the shuttle and is adapted to turn shaft 56 which is journalled for rotation between the side plates. A drive pinion 57 is secured to the motor shaft and meshes with a rack 59 formed in the upper wall of the frame. Actuation of motor causes the now-unlocked shuttle to be driven in the first direction toward its initial starting position.

As the unlocked shuttle approaches the initial starting position, surface 60 on each pawl arm contacts the other camming element 49 (FIG. 4) causing the arm to be rotated in a clockwise direction. The cam moves the arm sufficiently to allow the spring to pull the arm back into the ratchet engaging position. Here again, the lug 53 depresses a second actuator pin to open the switch contact and thus inactivate the return motor before the pawl arm is pulled back into the ratchet engaging position. The shuttle is thus automatically restored to its starting position whereupon it can once again be incrementally moved in the second direction along the described path of travel.

As best illustrated in FIGS. 1 and 3, the oscillator mechanism carried within the movable shuttle is driven by a stationarily mounted drive motor 65. The drive motor is mounted in a bracket 66 depending from the frame. Motor drive pinion 67 meshes with a spur gear 68 to turn an elongated spline shaft 70. The spline shaft is journalled in the frame adjacent to the shuttle and is placed in parallel alignment with the ratchet bars and guide rails defining the shuttle's path of travel. The shaft passes through a gear box 71 secured to the side plate 15 of the shuttle. A bevel gear 75, which meshes with bevel gear 25 pinned to the oscillator drive shaft, is rotatably supported in bearings between the sidewalls 76, 77 of the gear box. The bevel gear 75 includes an elongated hub 78 that surrounds the spline shaft. Female splines are formed within the hub which compliment those of the shaft whereby the gear can slidably move along the length of the shaft while the bevel gear is being continually turned.

Through means of the spline coupling, the oscillator drive shaft is continually driven from the drive motor as the shuttle moves back and forth along its path of travel. In the present embodiment of the invention, the oscillator gears remain coupled to the drive train whenever the engine is in operation.

It should therefore be evident that once the phase relationship of the eccentric masses is established by the positioning of the oscillator gears, the pawls can be cammed into and out of engagement with the ratchet bars without regard to the exact position of the masses and that this procedure can be carried out without affecting the operation of the engine. Accordingly, the engine does not require complex timing and control means for its successful operation.

Figure 7:
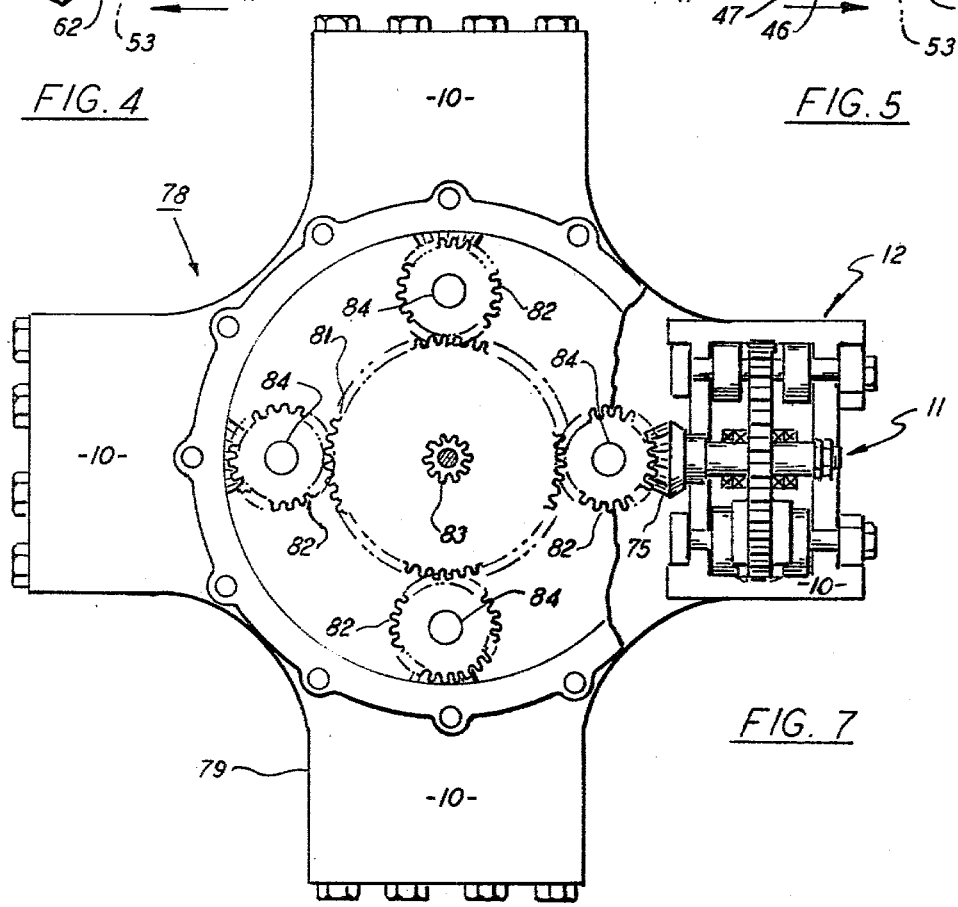
FIG. 7 is a top plan view of a further embodiment of the invention showing an engine having a plurality of shuttles movably mounted within a single frame.
Figure 6:
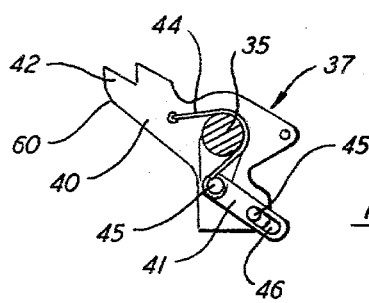
FIG. 6 is a broken-away view of the pawl shown in FIGS. 4 and 5.

Referring now to FIG. 7, there is shown an engine 78, containing four individual shuttles 11 mounted within a single engine block 79. Each shuttle assembly is movably contained in a frame 12 as described above to form a unit 10. Each unit, in turn, is driven from a central drive mechanism via a gear train.

As shown in FIG. 7, the front cover of the engine is removed to expose the gear train. The train includes a centrally located bull gear 81 adapted to drive four meshing spur gears 82 that are equally spaced about the bull gear. The bull gear is turned by an input shaft 83 connected to a motor (not shown) of any suitable design. Each spur gear, in turn, is locked to a spline shaft 84 which couples the input drive to the oscillator drive shaft as described above.

The relative position of each shuttle is regulated through means of the gear train drive. In practice, each shuttle is locked to its frame, and thus to the engine block, in a uniform timed relationship so that each unit will deliver a propelling thrust to the engine block in a programmed order. As depicted graphically in FIG. 8, the force pulses delivered to the block by each shuttle are phased at 90° intervals to provide a relatively even and uninterrupted output. The individual output of each unit is shown by the dotted line curves identified numerically as 85—85. The individual forces combine to produce a single resultant force noted by solid line curve 86.

Turning now to FIG. 9, there is shown a second pawl and ratchet arrangement that will enable the engine to deliver thrust in either direction. In this embodiment, the shuttle 98, includes two sets of independent pawl and ratchet mechanisms. One mechanism includes a pawl 90 and a ratchet bar 91 that is adapted to provide a thrust to the frame 92 which acts to the left of the shuttle. The other mechanism includes a pawl 93 and a bar 94 that is adapted to deliver a thrust to the frame in a second or opposite direction. The positioning of the pawl assemblies is controlled by means of electro-magnetic clutches 96 and 97. Clutch 96 controls pawl 90 while clutch 97 controls pawl 93. The clutches are arranged to work in opposition with each other so that as one pawl is moved into engagement with its companion ratchet, the other will be moved back out of engagement with the other ratchet. The clutches are energized by means of a common control signal so that one set of pawls is simultaneously moved into an engaged condition while the second set is moved in a release condition.

A reversible motor 99 is provided to drive the shuttle 98 in either direction. The common control signal is also used to condition the motor circuit to electrically reverse its direction of rotation in response to the positioning of the pawls to insure that the shuttle will be returned in the proper direction depending upon the direction of the thrust selected. In practice, the motor is turned on and off in the same manner as described above wherein at least one of the pawl assemblies are arranged to make contact switches positioned at each end of the shuttle's path of travel.

While this invention has been described with reference to the structure disclosed herein, it is not confined to the details as set forth and this application is intended to cover any modifications or changes that may come within the scope of the following claims.

I claim:
1. A method for developing thrust for propelling a vehicle or the like including the steps of
movably mounting at least one shuttle within a frame so that the shuttle is able to move back and forth within the frame along a linear path of travel,
producing an alternating series of opposed force pulses acting on the shuttle with the forces being generally directed along the path of travel of said shuttle,
locking the shuttle to the frame when the forces act in a first direction to propel said frame and said shuttle in said first direction,
unlocking the shuttle from the frame when the forces act in a second direction to move said shuttle within said frame in said second direction, and
restoring the shuttle to its inital starting position after it has travelled a predetermined distance along said path of travel.
2. The method of claim 1 wherein a plurality of shuttles are movably mounted with the frame and which further includes the step of regulating the phase relationship between force pulses to generate each pulse in an ordered sequence in respect to the other of said pulses.
3. The method of claim 2 which further includes the step of coordinating the movement of the shuttles within the frame to move the shuttles back and forth within the frame in a uniform timed relationship.
4. The method of claim 1 which further includes the step of reversing the locking and unlocking sequence so that the frame is propelled in the second direction.
5. The method of claim 1 wherein said alternating series of force pulses are produced by rotating weights secured to the shuttle at relatively high speeds.
6. Apparatus for developing a directional thrust suitable for propelling itself including
an unrestrained frame that is capable of moving freely in any direction,
a shuttle mounted within the frame for reciprocal movement along a linear path of travel:
oscillatory means affixed to the shuttle for producing an alternating series of opposed force pulses acting on the shuttle in both directions along said path of travel of said shuttle, and rectifying means for locking the shuttle to the frame when the force pulses act in a first direction to propel the frame and the shuttle in the first direction, and to unlock the shuttle from the frame when the forces act in a second direction, to move the shuttle in the second direction within the frame along said path of travel.

7. The system of claim 6 that further includes a return means for restoring the shuttle to its initial starting position after it has moved a predetermined distance over the path of travel in the second direction.

8. The system of claim 7 wherein said return means further includes a clutch for holding the rectifying means in an unlocked condition and a motor drive acting between the shuttle and the frame for driving the shuttle in said first direction back to its initial starting position.

9. The system of claim 6 wherein said rectifying means is a pawl and ratchet mechanism coupled between the shuttle and the frame for preventing the shuttle from moving along said path of travel in the first direction and to permit the shuttle to move freely in the second direction along said path of travel.

10. The system of claim 6 that further includes reversing means for reversing the function of the rectifying means whereby the frame is propelled in the opposite direction.

11. The system of claim 7 wherein said oscillator means includes three meshing gears of equal diameters that are mounted in series upon parallel shafts with the shafts being supported within the shuttle normal to the shuttle's path of travel, an unbalancing weight eccentrically mounted on each of the gears with the mass of the central weight in the series being about twice that of the two outer weights and the weights being positioned so that the forces produced are offset in a direction normal to the shuttle's path of travel and combined in either direction along said path of travel, and drive means for driving said gears.

12. The system of claim 11 wherein said drive means includes a driven spline shaft mounted in the frame parallel to the shuttle's path of travel, a pair of mating bevel gears having one gear affixed to one of the oscillator shafts and the hub of the other gear slidably meshing with the splines of the driven shaft whereby the bevel gears can move with the shuttle while simultaneously being turned by said splined shaft.

13. A system for developing a thrust suitable for propelling a vehicle including a frame adapted to be secured to a vehicle, a plurality of shuttles each of which is mounted for reciprocal movement along linear paths of travel within the frame with the paths of travel being in parallel alignment, an oscillator means affixed to each of the shuttles for imparting an alternating series of opposed force pulses to the shuttle so that the forces act in a first direction and then a second direction with the directions being generally aligned along the path of travel of the shuttle, rectifying means acting between each shuttle and the frame for locking the shuttle to the frame when the forces act in the first direction, to propel the frame and the shuttles in the first direction, and to unlock the shuttle from the frame when the forces act in the second direction whereby the shuttle is moved in the second direction along its path of travel, restoring means operatively associated with each shuttle for returning the shuttle to its initial starting position within the frame after it has moved a predetermined distance along its path of travel.

14. The system of claim 13 which further includes a drive means operatively connected to each of the oscillator means for providing input power to said oscillator.

15. The system of claim 14 wherein each oscillator is connected to the drive means through a gear train and the gear trains are arranged to drive the oscillators in a timed relationship from a common drive gear.

16. The system of claim 13 wherein said rectifying means is a pawl and ratchet mechanism acting between each shuttle and the frame.

17. The system of claim 16 further including a first camming means positioned at the end of the path of travel of each shuttle for moving the pawl out of engagement with the ratchet when the shuttle approaches the end of said path of travel, actuator means engagable by the shuttle at the end of said path of travel for actuating the restoring means when the pawl is moved out of engagement with the ratchet whereby the shuttle is returned to its initial starting position, second camming means located in the starting position for moving the pawl back into engagement with the ratchet, and deactivating means engagable by the shuttle as it approaches the starting position for deactivating the restoring means prior to pawls being cammed back into engagement with the ratchet.

* * * * *